(12) United States Patent
Kim et al.

(10) Patent No.: US 8,677,788 B2
(45) Date of Patent: Mar. 25, 2014

(54) METHOD OF FORMING A DRUM TYPE WASHING MACHINE HAVING A DRIVING UNIT

(75) Inventors: Jae Kyum Kim, Kyongsangnam-do (KR); Ho Cheol Kwon, Kyongsangnam-do (KR); Jong A Park, Kyongsangnam-do (KR); Kang Mo Choi, Kyongsangnam-do (KR)

(73) Assignee: LG Electronics Inc., Seoul (KR)

( * ) Notice: Subject to any disclaimer, the term of this patent is extended or adjusted under 35 U.S.C. 154(b) by 100 days.

(21) Appl. No.: 13/329,956

(22) Filed: Dec. 19, 2011

(65) Prior Publication Data

US 2012/0085132 A1    Apr. 12, 2012

Related U.S. Application Data

(63) Continuation of application No. 11/453,037, filed on Jun. 15, 2006, now Pat. No. 8,087,148, which is a continuation of application No. 10/669,445, filed on Sep. 25, 2003, now Pat. No. 7,131,178, which is a continuation of application No. 10/231,314, filed on Aug. 30, 2002, now Pat. No. 7,114,355, which is a continuation of application No. 09/624,144, filed on Jul. 21, 2000, now Pat. No. 6,460,382.

(30) Foreign Application Priority Data

Oct. 18, 1999   (KR) .............. 1999-0045088
Oct. 18, 1999   (KR) .............. 1999-0045089

(51) Int. Cl.
*D06F 29/00*   (2006.01)
*D06F 35/00*   (2006.01)

(52) U.S. Cl.
USPC .......................... 68/24; 29/525.01

(58) Field of Classification Search
USPC .............. 29/525.01; 68/14, 23.7, 23 R, 23.1, 68/23.2, 23.3, 23.6, 24
See application file for complete search history.

(56) References Cited

U.S. PATENT DOCUMENTS 2,531,225 A   11/1950   Le Tourneau
2,656,702 A   10/1953   Chapin
(Continued)

FOREIGN PATENT DOCUMENTS

CH    462 765      11/1968
DE   1 907 719      8/1970
(Continued)

OTHER PUBLICATIONS

European Search Report for EP 04 07 7356 Oct. 4, 2004.
(Continued)

*Primary Examiner* — David Bryant
*Assistant Examiner* — Christopher Koehler
(74) *Attorney, Agent, or Firm* — KED & Associates, LLP

(57) ABSTRACT

The washing machine includes a tub mounted in a cabinet, a drum mounted in the tub, a shaft that transmits a driving force from a motor to the drum, front and rear bearings mounted on an outer circumference of opposite end portions of the shaft, a bearing housing built in a central portion of a rear wall of the tub to support the front bearing, a rotor coupled to the rear end portion of the shaft, a stator fixed to the tub rear wall inward of the rotor, and a connector of the rotor that serration coupled to the outer circumference of the shaft in front of the rear bearing so as to transmit rotating power from the rotor to the shaft. A bearing bracket may be fixed to the rear wall of the tub so as to cover an outside of the rotor and support the rear bearing.

25 Claims, 10 Drawing Sheets

(56) References Cited

U.S. PATENT DOCUMENTS

| | | | |
|---|---|---|---|
| 3,138,727 A | 6/1964 | Ellner | |
| 3,194,032 A | 7/1965 | Von Brimer | |
| 3,227,030 A | 1/1966 | Preziosi et al. | |
| 3,248,908 A | 5/1966 | Pope | |
| 3,333,443 A | 8/1967 | Chung et al. | |
| 3,604,222 A | 9/1971 | Wutherich et al. | |
| 3,840,764 A | 10/1974 | Burger | |
| 3,914,963 A | 10/1975 | Brimer | |
| 4,423,607 A | 1/1984 | Munini | |
| 4,446,706 A * | 5/1984 | Hartwig | 68/24 |
| 4,566,864 A | 1/1986 | Yamamoto et al. | |
| 4,623,812 A | 11/1986 | van de Griend | |
| 4,686,399 A | 8/1987 | Imori et al. | |
| 4,701,653 A | 10/1987 | Merkle et al. | |
| 4,701,654 A | 10/1987 | Tatukawa et al. | |
| 4,712,035 A | 12/1987 | Forbes et al. | |
| 4,734,604 A | 3/1988 | Sontheimer et al. | |
| 4,763,037 A | 8/1988 | Hashimoto et al. | |
| 4,853,571 A | 8/1989 | Smith et al. | |
| 4,995,598 A | 2/1991 | Ingham | |
| 4,998,052 A | 3/1991 | Erdman et al. | |
| 5,040,285 A | 8/1991 | Williams et al. | |
| 5,150,589 A * | 9/1992 | Williams et al. | 68/23.7 |
| 5,266,855 A | 11/1993 | Smith et al. | |
| 5,329,791 A | 7/1994 | Cargnel et al. | |
| 5,353,613 A * | 10/1994 | Smith et al. | 68/23.7 |
| 5,442,250 A | 8/1995 | Stridsberg | |
| 5,463,883 A | 11/1995 | Pellerin et al. | |
| 5,489,811 A | 2/1996 | Kern et al. | |
| 5,497,040 A | 3/1996 | Sato | |
| 5,528,092 A | 6/1996 | Ohta | |
| 5,586,455 A * | 12/1996 | Imai et al. | 68/12.02 |
| 5,659,216 A | 8/1997 | Bisantz | |
| 5,677,816 A | 10/1997 | Oh | |
| 5,737,944 A * | 4/1998 | Nishimura et al. | 68/23.7 |
| 5,778,703 A | 7/1998 | Imai et al. | |
| 5,809,809 A | 9/1998 | Neumann | |
| 5,825,108 A | 10/1998 | De Filippis | |
| 5,862,686 A * | 1/1999 | Skrippek | 68/140 |
| 5,874,796 A * | 2/1999 | Petersen | 310/156.45 |
| 5,894,746 A | 4/1999 | Skrippek | |
| 5,907,206 A | 5/1999 | Shiga et al. | |
| 5,966,379 A | 10/1999 | Phillips et al. | |
| 5,975,846 A | 11/1999 | Wistinghausen | |
| 5,996,379 A | 12/1999 | Skrippek | |
| 6,006,553 A | 12/1999 | Lee et al. | |
| 6,023,839 A | 2/2000 | Kinoshita | |
| 6,049,930 A | 4/2000 | Hisano et al. | |
| 6,050,113 A | 4/2000 | Skrippek et al. | |
| 6,131,422 A * | 10/2000 | Skrippek et al. | 68/140 |
| 6,148,647 A * | 11/2000 | Kabeya et al. | 68/140 |
| 6,257,027 B1 | 7/2001 | Imai | |
| 6,339,275 B1 | 1/2002 | Katagiri | |
| 6,341,507 B1 | 1/2002 | Rode et al. | |
| 6,396,190 B1 | 5/2002 | Ahn et al. | |
| 6,626,014 B2 | 9/2003 | Heyder et al. | |
| 6,661,550 B2 | 12/2003 | Konno et al. | |
| 6,681,602 B2 * | 1/2004 | Heyder et al. | 68/140 |
| 7,380,424 B2 | 6/2008 | Kim et al. | |
| 7,444,841 B2 | 11/2008 | Kim et al. | |
| 2002/0194884 A1 | 12/2002 | Heyder et al. | |
| 2006/0196233 A1 | 9/2006 | Kim et al. | |
| 2007/0113597 A1 | 5/2007 | Kim | |
| 2007/0125135 A1 | 6/2007 | Kim et al. | |

FOREIGN PATENT DOCUMENTS

| | | |
|---|---|---|
| DE | 31 05 318 A1 | 8/1982 |
| DE | 36 14 703 A1 | 11/1986 |
| DE | 36 34 214 A1 | 4/1988 |
| DE | 43 35 966 A1 | 4/1995 |
| DE | 43 41 832 A1 | 6/1995 |
| DE | 197 24 475 A1 | 12/1998 |
| DE | 100 58 409 A1 | 5/2002 |
| EP | 0 043 429 B1 | 1/1982 |
| EP | 0 198 554 B1 | 10/1986 |
| EP | 0 219 115 B1 | 4/1987 |
| EP | 0 354 158 B1 | 2/1990 |
| EP | 0 361 775 B1 | 4/1990 |
| EP | 0 374 519 B1 | 6/1990 |
| EP | 0 620 308 B1 | 10/1994 |
| EP | 0 629 735 B1 | 12/1994 |
| EP | 0 657 575 B1 | 6/1995 |
| EP | 0 780 507 B1 | 6/1997 |
| EP | 0 789 103 B1 | 8/1997 |
| EP | 0 953 668 B1 | 11/1999 |
| EP | 1 094 144 B1 | 4/2001 |
| EP | 1094145 | 4/2001 |
| EP | 1 548 171 A2 | 6/2005 |
| EP | 1 619 286 A2 | 1/2006 |
| GB | 0 701 511 | 12/1953 |
| GB | 2 006 836 A | 5/1979 |
| GB | 2 030 896 A | 4/1980 |
| GB | 2 189 511 A | 10/1987 |
| GB | 2 202 867 A | 10/1988 |
| GB | 2 261 881 A | 6/1993 |
| GB | 2 272 913 A | 6/1994 |
| GB | 2 322 240 A | 8/1998 |
| GB | 2 332 212 A | 6/1999 |
| GB | 2 333 300 A | 7/1999 |
| JP | 58-207834 A | 12/1983 |
| JP | 59-035548 A | 2/1984 |
| JP | 60-005197 A | 1/1985 |
| JP | 61-017877 A | 1/1986 |
| JP | 61-236350 A | 10/1986 |
| JP | 02-014278 A | 1/1990 |
| JP | 04-033536 A | 2/1992 |
| JP | 04-317547 A | 11/1992 |
| JP | 05-176488 A | 7/1993 |
| JP | 07-067284 | 3/1995 |
| JP | 07-068086 A | 3/1995 |
| JP | 07-259866 A | 10/1995 |
| JP | 08-019229 A | 1/1996 |
| JP | 09-098547 A | 4/1997 |
| JP | 09-103596 A | 4/1997 |
| JP | 09-182368 A | 7/1997 |
| JP | 10-210727 A | 8/1998 |
| JP | 11-028298 A | 2/1999 |
| JP | 11-089198 A | 3/1999 |
| JP | 11-137884 A | 5/1999 |
| JP | 11-207077 A | 8/1999 |
| JP | 11-207086 A | 8/1999 |
| JP | 11-236921 | 8/1999 |
| JP | 11-239692 A | 9/1999 |
| JP | 11-276777 A | 10/1999 |
| JP | 11-285205 A | 10/1999 |
| JP | 2000-042287 A | 2/2000 |
| JP | 2000-325693 A | 11/2000 |
| JP | 2000-334194 A | 12/2000 |
| JP | 2001-113089 | 4/2001 |
| JP | 2003-326083 A | 11/2003 |
| KR | 10-1998-0058943 U | 10/1998 |
| KR | 10-1999-0030909 A | 5/1999 |
| KR | 10-0238825 B1 | 1/2000 |
| KR | 10-2000-0077232 A | 12/2000 |
| WO | WO 95/17543 A1 | 6/1995 |
| WO | WO 98/00902 A1 | 1/1998 |
| WO | WO 98/36123 A2 | 8/1998 |
| WO | WO 98/56973 A1 | 12/1998 |
| WO | WO 98/56974 A1 | 12/1998 |
| WO | WO 98/59102 A1 | 12/1998 |
| WO | WO 01/44556 | 6/2001 |

OTHER PUBLICATIONS

Japanese Decision /LG Electronics Inc.—Appeal filed in regard to "Structure of Driving Unit in Drum Type Washing Machine", JP 2000-246072, (Apr. 27, 2007)—and English Language Translation.
Korean Decision /*LG Electronics Inc.* v. *Daewoo Electronics, Ltd.*—Provisional Disposition to Inhibit Infringement, (Jun. 19, 2007)—and English Language Translation.
European Office Actions dated Oct. 28, 2008 (4) issued in Application Nos. 04 077 350.9; 04 077 351.7; 04 078 028.2 and 04 079 097.6.

(56) References Cited

OTHER PUBLICATIONS

Complaint in pending litigation against ASKO Appliance Inc. et al. filed on Nov. 5, 2008.

Request for Reexamination of U.S. Patent No. 6,460,382 filed Nov. 14, 2008.

Request for Reexamination of U.S. Patent No. 6,914,363 filed Dec. 5, 2008.

Request for Reexamination of U.S. Patent No. 7,418,843 filed Dec. 15, 2008 (Reexamination Control No. 90/009,362).

Decision Granting Request for Reexamination No. 90/009,362 of U.S. Patent No. 7,418,843 issued Jan. 23, 2009.

Corrected Request for Reexamination No. 90/009,331 of U.S. Patent No. 6,460,382 filed Jan. 28, 2009.

Corrected Request for Reexamination No. 90/009,330 of U.S. Patent No. 7,380,424 filed Jan. 28, 2009.

Corrected Request for Reexamination No. 90/009,349 of U.S. Patent No. 6,914,363 filed Feb. 9, 2009.

Decision Granting Request for Reexamination No. 90/009,331 of U.S. Patent No. 6,460,382 issued Feb. 26, 2009.

Decision Granting Request for Reexamination No. 90/009,330 of U.S. Patent No. 7,380,424 issued Feb. 26, 2009.

Decision Granting Request for Reexamination No. 90/009,349 of U.S. Patent No. 6,914,363 issued Apr. 27, 2009.

Plaintiff's Memorandum in Opposition to Motion to Stay and in support of Cross-Motion for Preliminary Injunction filed on May 18, 2009 in pending litigation against ASKO Appliance Inc.

Defendants' Reply in Further Support of Motion to Stay Litigation in pending litigation against ASKO Appliance Inc. et al. on filed May 29, 2009.

Declaration in Support of Defendants' Reply in pending litigation against ASKO Appliance Inc. et al. filed on May 29, 2009.

Order Denying Defendants' Motion for Stay and Dismissing Plaintiff's Motion for Preliminary Injunction in pending litigation against ASKO Appliance Inc. et al. filed on Jun. 17, 2009.

Interview Summary dated Oct. 15, 2009 issued in U.S. Appl. No. 90/009,349.

Office Action dated Aug. 28, 2009 issued in U.S. Appl. No. 90/009,349.

Amendment dated Oct. 28, 2009 issued in U.S. Appl. No. 90/009,349.

Notice of Intent to Issue a Reexamination Certificated for Reexamination No. 90/009,330 of U.S. Patent No. 7,380,424 dated Nov. 20, 2009.

Substance of Interview dated Nov. 16, 2009 issued in Reexamination No. 90/009,349.

Office Action dated Nov. 20, 2009 issued in Reexamination Control No. 90/009,331.

Notice of Allowance issued in Japanese Application No. 2003-133510 dated Nov. 22, 2010.

Notice of Allowance issued in Japanese Application No. 2004-331277 dated Nov. 22, 2010.

European Search Report for Application No. 04077350.9 dated Aug. 1, 2006.

United States Office Action dated Feb. 4, 2002 issued in U.S. Appl. No. 09/624,144.

United States Office Action dated Jan. 27, 2005 issued in U.S. Appl. No. 10/942,795.

United States Office Action dated Aug. 5, 2005 issued in U.S. Appl. No. 11/074,836.

United States Office Action dated Oct. 4, 2005 issued in U.S. Appl. No. 10/231,314.

United States Office Action dated Oct. 4, 2005 issued in U.S. Appl. No. 10/942,968.

United States Office Action dated Apr. 19, 2005 issued in U.S. Appl. No. 10/231,314.

United States Office Action dated Jul. 26, 2005 issued in U.S. Appl. No. 10/231,314.

United States Office Action dated Sep. 21, 2005 issued in U.S. Appl. No. 10/942,967.

United States Office Action dated Sep. 21, 2005 issued in U.S. Appl. No. 11/074,835.

United States Office Action dated Sep. 30, 2005 issued in U.S. Appl. No. 10/669,445.

United States Office Action dated Apr. 18, 2006 issued in U.S. Appl. No. 11/074,835.

United States Office Action dated May 26, 2006 issued in U.S. Appl. No. 10/942,968.

United States Office Action dated Jul. 6, 2006 issued in U.S. Appl. No. 10/942,967.

United States Office Action dated Nov. 17, 2006 issued in U.S. Appl. No. 10/942,968.

United States Office Action dated Jan. 18, 2007 issued in U.S. Appl. No. 11/074,835.

United States Office Action dated Feb. 28, 2007 issued in U.S. Appl. No. 10/942,967.

United States Office Action dated Jul. 12, 2007 issued in U.S. Appl. No. 11/074,835.

United States Office Action dated Jul. 13, 2007 issued in U.S. Appl. No. 10/942,968.

United States Office Action dated Nov. 28, 2007 issued in U.S. Appl. No. 11/074,835.

United States Office Action dated Jan. 29, 2008 issued in U.S. Appl. No. 11/074,835.

United States Office Action dated Sep. 16, 2009 issued in U.S. Appl. No. 11/453,037.

United States Office Final Action dated Jun. 9, 2010 issued in U.S. Appl. No. 11/453,037.

\* cited by examiner

METHOD OF FORMING A DRUM TYPE WASHING MACHINE HAVING A DRIVING UNIT

CROSS-REFERENCE TO RELATED APPLICATIONS

This application is a Continuation Application of prior U.S. patent application Ser. No. 11/453,037 filed Jun. 15, 2006, which is a Continuation of U.S. patent application Ser. No. 10/669,445 filed Sep. 15, 2003 (now U.S. Pat. No. 7,131, 178), which is a Continuation Application of U.S. patent application Ser. No. 10/231,314 filed Aug. 30, 2002 (now U.S. Pat. No. 7,114,355), which is a Continuation Application of U.S. patent application Ser. No. 09/624,144 filed Jul. 21, 2000 (now U.S. Pat. No. 6,460,382), which claims priority under 35 U.S.C. §119 to Korean Application Nos. 10-1999-0045088 and 10-1999-0045089 both filed on Oct. 18, 1999, whose entire disclosures are hereby incorporated by reference.

BACKGROUND

1. Field

The present invention relates to a drum type washing machine, and more particularly, to a structure of a driving unit in a drum type washing machine.

2. Background

In general, a drum type washing machine washes using friction between a drum rotated by a motor and laundry, detergent, and washing water, introduced into the drum, and provides effects of beating and rubbing while doing almost no damage to the laundry, and causing no entangling of the laundry. A structure of a related art drum washing machine will be explained with reference to FIG. 1. FIG. 1 illustrates a longitudinal section of a related art drum type washing machine, provided with a tub 2 mounted inside of a cabinet 1, a drum 3 rotatably mounted on a central portion of inside of the tub 2. There is a motor 5a under the tub 2 connected with a pulley 18. There is a drum shaft 4 connected to a rear of the drum 3, to which a drum pulley 19 is coupled. And, the drum pulley 19 on the drum shaft 4 and the motor pulley 18 connected to the motor 5a are connected by a belt 20 for transmission of power. And, there is a door 21 in a front part of the cabinet 1, with a gasket 22 between the door 21 and the tub 2. There is a hanging spring 23 between an inside of an upper portion of the cabinet 1 and an outside of an upper portion of the tub 2, and a friction damper 24 between an inside of a lower portion of the cabinet 1 and a lower side of an outside of the tub 2 for damping vibration of the tub 2 generated during spinning.

However, the related art washing machine has the following disadvantages since driving power of the motor 5a is transmitted to the drum 3 through the motor pulley 18, and the drum pulley 19, and the belt 20 connecting the motor pulley 18 and the drum pulley 19.

First, there is a loss of energy in the course of transmitting driving power because the driving power is transmitted from the motor 5a to the drum 3, not directly, but through the belt 20 wound around the motor pulley 18 and the drum pulley 19.

And, the transmission of driving power from the motor 5a to the drum 3, not directly, but through many components, such as the belt 20, the motor pulley 18, and the drum pulley 19, causes much noise in the course of power transmission.

The numerous components required for transmission of driving power from the motor 5a to the drum 3, such as the motor pulley 18, the drum pulley 19 and the belt 20, require many assembly man-hours. And, the more the number of components required for transmission of driving power from the motor 5a to the drum 3, the more number of spots which require repair, and the more frequent at which repair required.

In summary, the indirect driving power transmission from the motor 5a to the drum 3 through the motor pulley, the drum pulley, and the belt requires many repairs, generates much noise, wastes energy, and results in a deterioration of a washing capability.

Moreover, the tub 2 of stainless steel in general in the related art drum washing machine is expensive, has poor formability, and is heavy.

SUMMARY OF THE INVENTION

Accordingly, the present invention is directed to a structure of a driving unit in a drum type washing machine that substantially obviates one or more of the problems due to limitations and disadvantages of the related art.

An object of the present invention is to provide a structure of driving unit in a drum type washing machine, which can reduce noise, repair and waste of energy, and moreover, improve washing capability.

Another object of the present invention is to provide a structure of driving unit in a drum type washing machine, which has an improved supporting force.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the structure of a driving unit in a drum type washing machine having a tub mounted in a cabinet, a drum mounted in the tub, a shaft fixed to the drum for transmission of driving power from the motor to the drum, and bearings mounted on an outer circumference of the shaft at opposite end portions thereof, includes a metallic bearing housing at a central portion of a rear wall of the tub for supporting the bearings mounted on the outer circumferences of opposite end portions of the shaft.

In other aspect of the present invention, there is provided a structure of driving unit in a drum type washing machine including a tub mounted inside of a cabinet, a bearing housing built in a central portion of a rear wall of the tub for supporting a bearing therein, a shaft connected to a drum mounted inside of the tub for transmission of a driving force from a motor to the drum, bearings mounted on an outer circumference of the shaft at opposite end portions thereof respectively, a rotor coupled to a rear end of the shaft, a stator provided inward of the rotor fixed to the tub rear wall, a connector provided between the shaft and the rotor for transmission of a rotating force from the rotor to the shaft for rotating the shaft and the rotor together, and a supporter fitted between the rear wall of the tub and the stator for supporting the stator and maintaining a concentricity when the stator is mounted to the tub rear wall.

In another aspect of the present invention, there is provided a structure of driving unit in a drum type washing machine including a tub of plastic mounted inside of a cabinet, a metallic bearing housing inserted and built in a central portion of a rear wall of the tub having steps of "]" and "[" forms on an inner circumference for supporting bearings therein, a shaft connected to a drum mounted inside of the tub for transmission of a driving power from a motor to the drum, having a front end portion fixed to a spider in the drum rear wall, a brass bushing press fit on a region of the shaft from a portion exposed in rear of the spider to the front bearing for prevention of rusting of the shaft, and steps on an outer circumference thereof for fixing mounting positions of the front bearing and the rear bearing on the shaft, bearings mounted on the outer circumference of the shaft at opposite end portions thereof respectively, a rotor of steel or steel alloy plate coupled to the rear end portion of the shaft, including a bent portion formed along a circumference thereof having a setting surface for supporting magnets fitted to an inside of a front portion of a sidewall extended forward from a periphery of a rear wall, and a hub at a center of the rear wall having a through hole for a fastening member, such as a bolt, for coupling the rotor to the shaft, a plurality of cooling fins formed around the hub in a radial direction each with a length for blowing air toward the stator when the rotor is rotated for cooling down a heat generated at the stator, an embossing between adjacent cooling fins on the rear wall of the rotor for reinforcing the rotor, and a drain hole in each of the embossings, for drain of water, a stator composing the motor together with the rotor, fixed to the tub rear wall inward of the rotor, a connector of plastic provided between the shaft and the rotor for transmission of a rotating force from the rotor to the shaft for rotating the shaft for rotating the shaft and the rotor together, and a supporter fitted between the rear wall of the tub and the stator for supporting the stator and maintaining a concentricity when the stator is mounted to the tub rear wall.

In further aspect of the present invention, there is provided a structure of driving unit in a drum type washing machine including a tub mounted inside of a cabinet, a drum mounted inside of the tub, a shaft connected to the drum mounted inside of the tub for transmission of a driving force from a motor to the drum, a front bearing and a rear bearing mounted on an outer circumference of the shaft at opposite end portions thereof respectively, a bearing housing built in a central portion of a rear wall of the tub for supporting the front bearing, a rotor composing the motor together with the rotor, and coupled to the rear end portion of the shaft, a stator fixed to the tub rear wall inward of the rotor to compose the motor together with the rotor, a connector serration coupled to the outer circumference of the shaft in front of the rear bearing and fixed to the rotor, for transmission of a rotating power from the rotor to the shaft, and a bearing bracket fixed to the rear wall of the tub to cover an outside of the rotor and support the rear bearing.

In a still further aspect of the present invention, there is provided a structure of driving unit in a drum type washing machine including a tub of plastic mounted inside of a cabinet, a metallic bearing housing inserted to built in a central portion of a rear wall of the tub having steps on an inner circumference for supporting bearings therein, a shaft connected to a drum mounted inside of the tub for transmission of a driving power from a motor to the drum, having a front end portion fixed to a spider in the drum rear wall, and a brass bushing press fit on a region of the shaft from a portion exposed in rear of the spider to the front bearing for prevention of rusting of the shaft, bearings mounted on the outer circumference of the shaft at opposite end portions thereof respectively, a rotor of steel or steel alloy plate coupled to the rear end portion of the shaft, including a bent portion formed along a circumference thereof having a setting surface for supporting magnets fitted to an inside of a front portion of a sidewall extended forward from a periphery of a rear wall, and a hub at a center of the rear wall having a through hole for a fastening member, such as a bolt, for coupling the rotor to the shaft, a plurality of cooling fins formed around the hub in a radial direction each with a length for blowing air toward the stator when the rotor is rotated for cooling down a heat generated at the stator, an embossing between adjacent cooling fins on the rear wall of the rotor for reinforcing the rotor, and a drain hole in each of the embossings, for drain of water, a stator composing the motor together with the rotor, fixed to the tub rear wall inward of the rotor, a connector of plastic provided between the shaft and the rotor for transmission of a rotating force from the rotor to the shaft for rotating the shaft and the rotor together, a supporter fitted between the rear wall of the tub and the stator for supporting the stator and maintaining a concentricity when the stator is mounted to the tub rear wall, and a bearing bracket fixed to the rear wall of the tub to cover an outside of the rotor and support the rear bearing.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Figure 1:
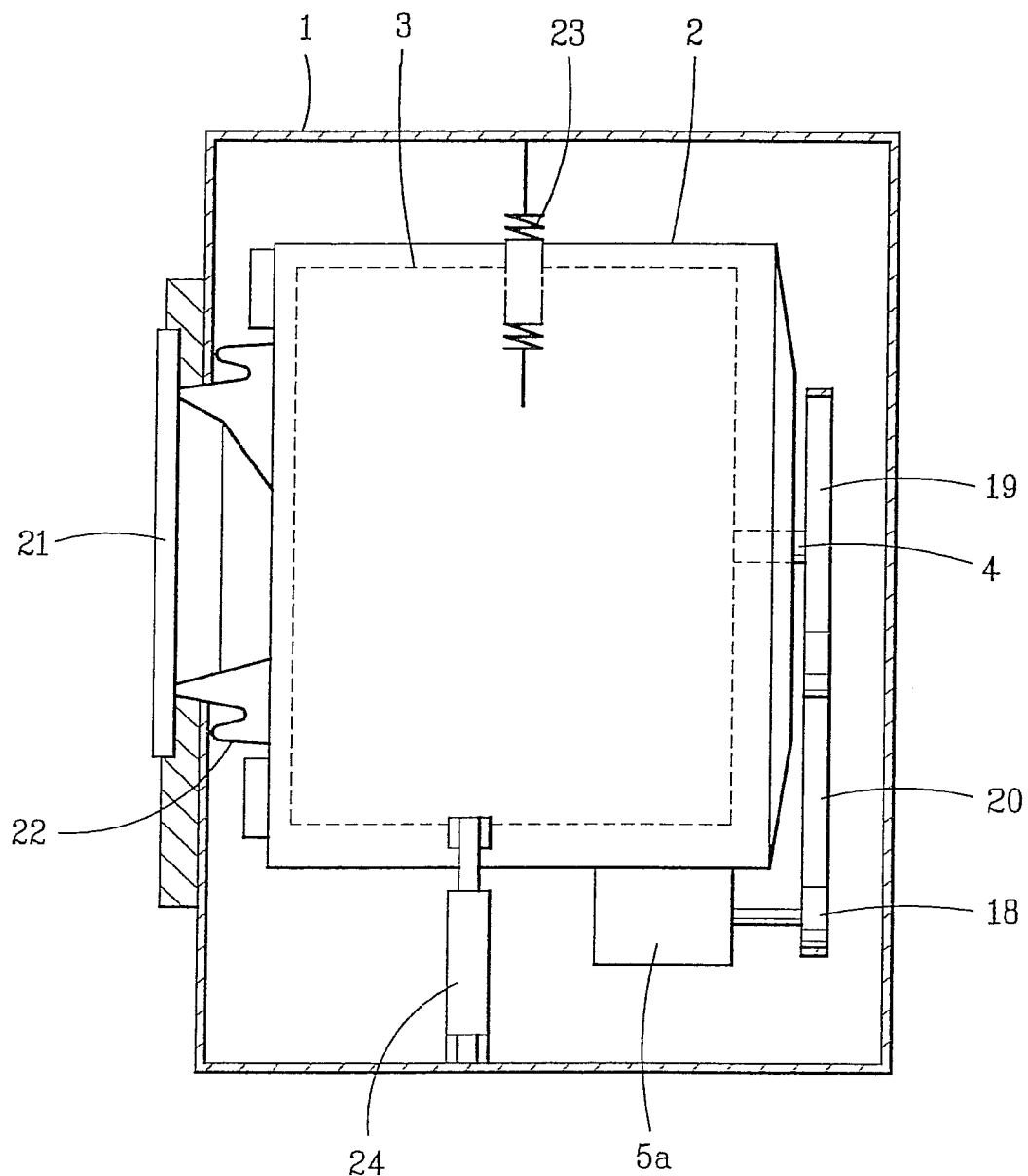
FIG. 1 illustrates a longitudinal section of a related art drum type washing machine.
Figure 2A:
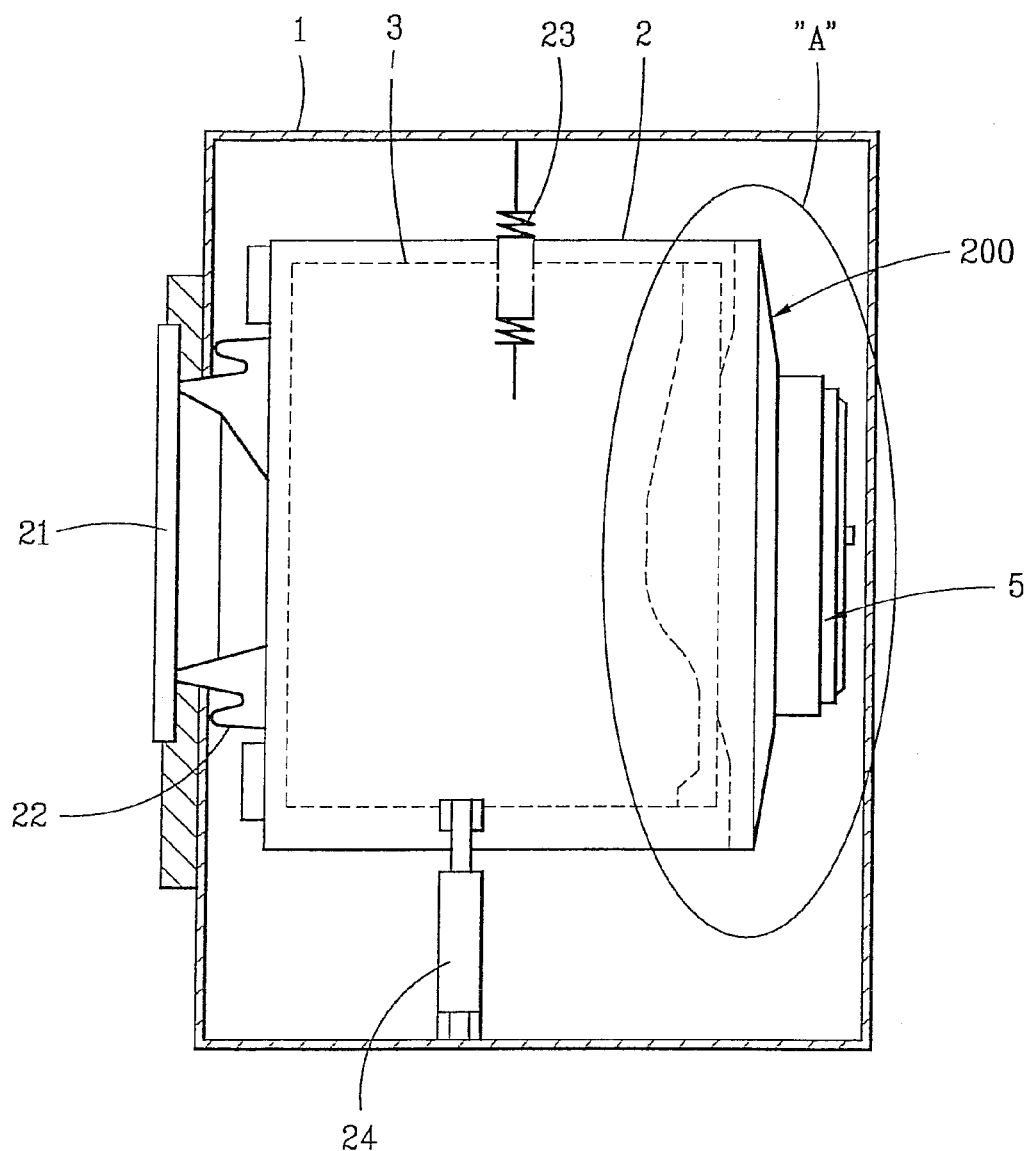
FIG. 2A illustrates a longitudinal section of a drum type washing machine in accordance with a first preferred embodiment of the present invention.
Figure 2B:
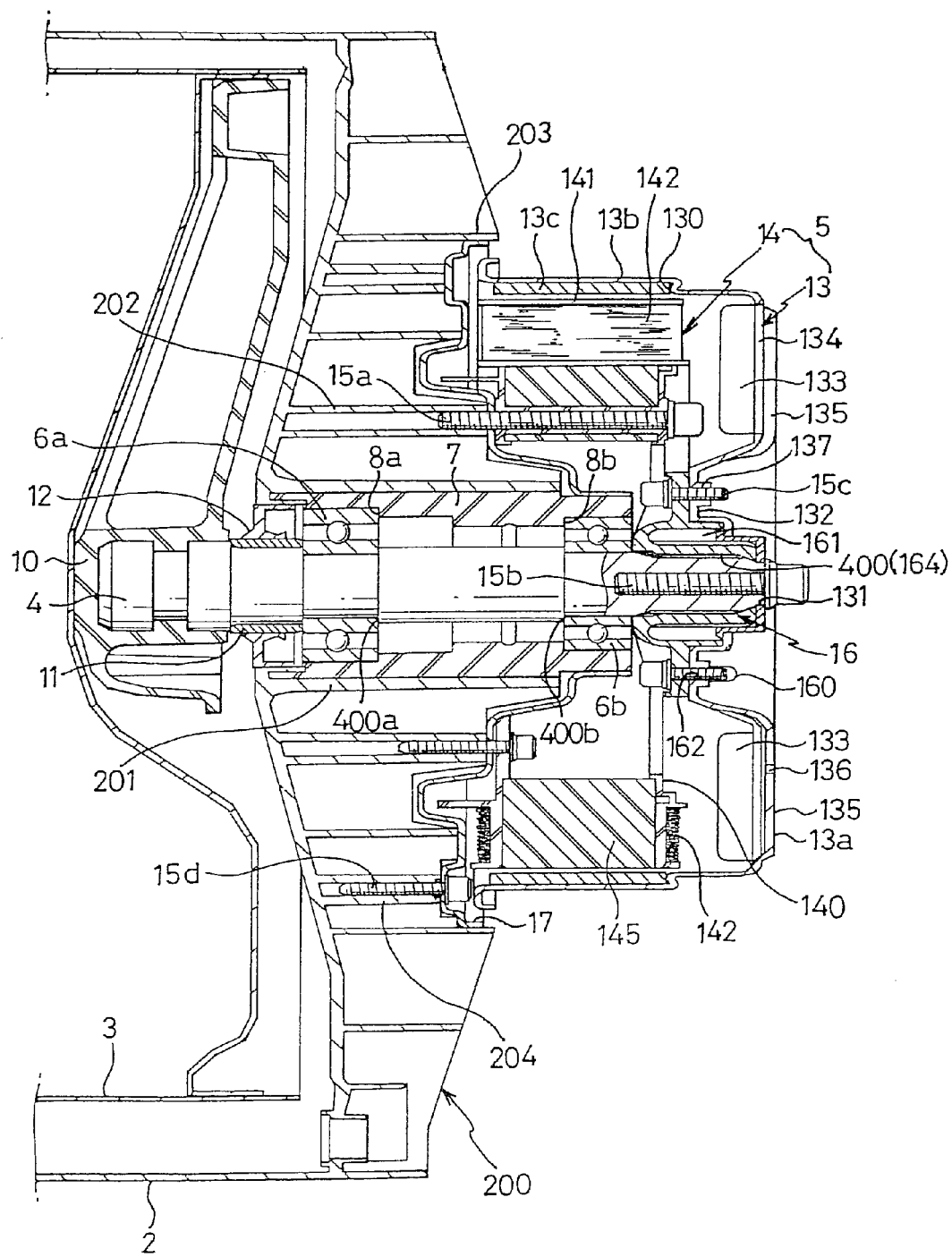
FIG. 2B illustrates a detailed enlarged view of "A" part in FIG. 2A.
Figure 6:
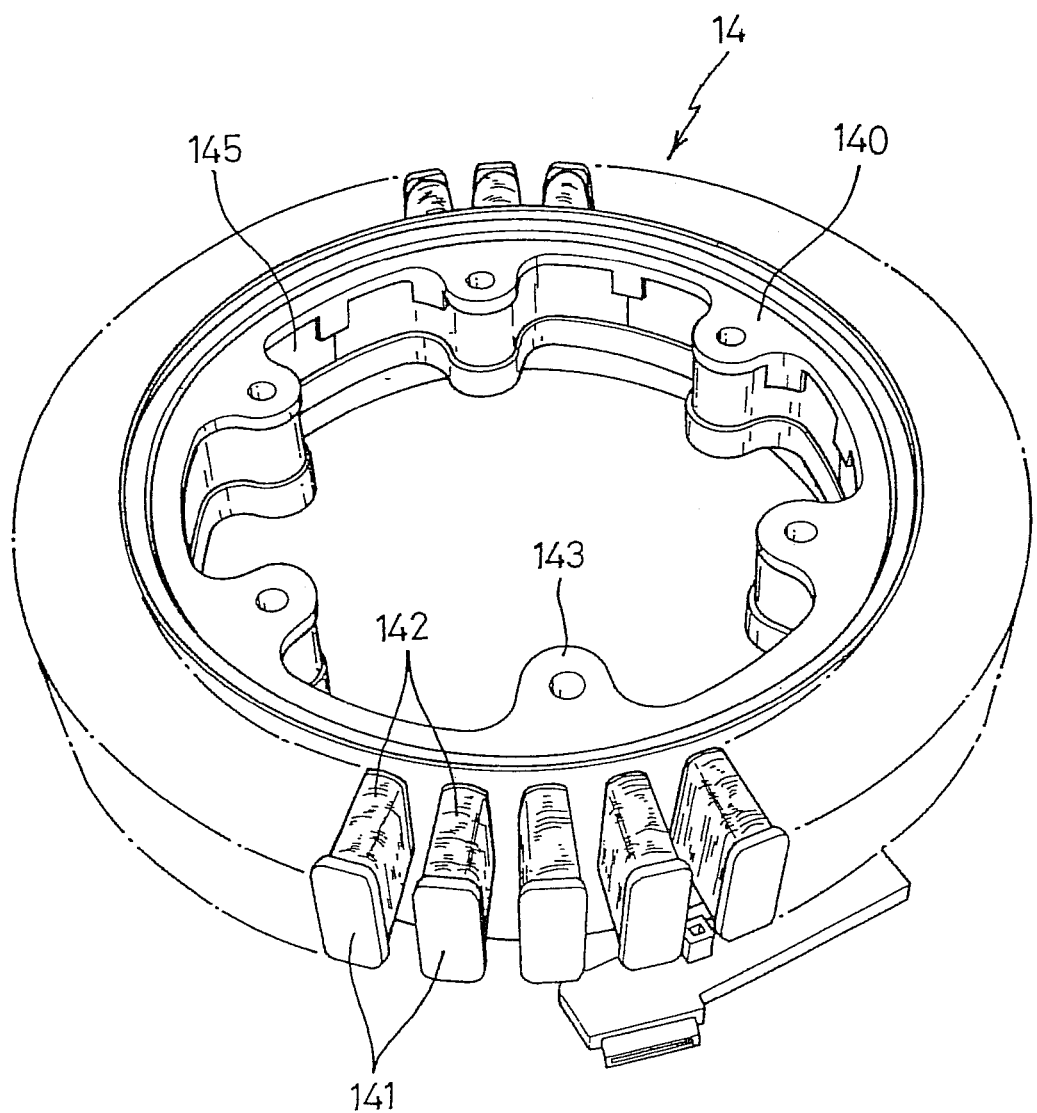
FIG. 6 illustrates a perspective view of the stator in FIG. 2.
Figure 7:
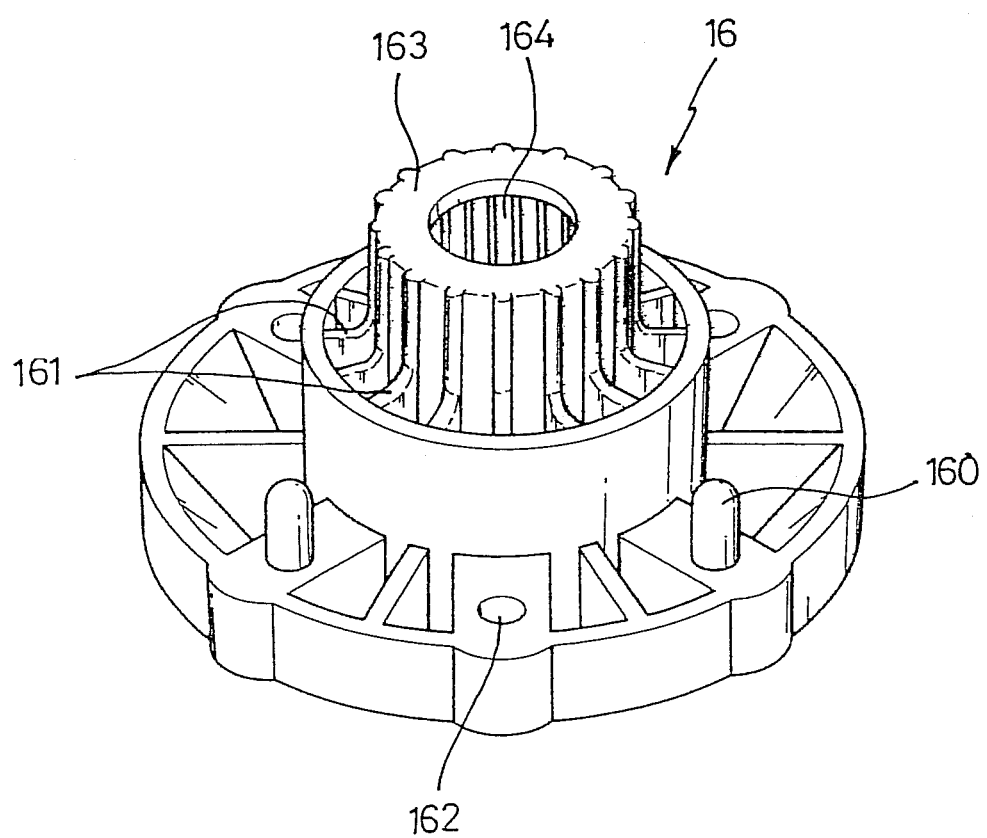
FIG. 7 illustrates a perspective view of the connector in FIG. 2.
Figure 8:
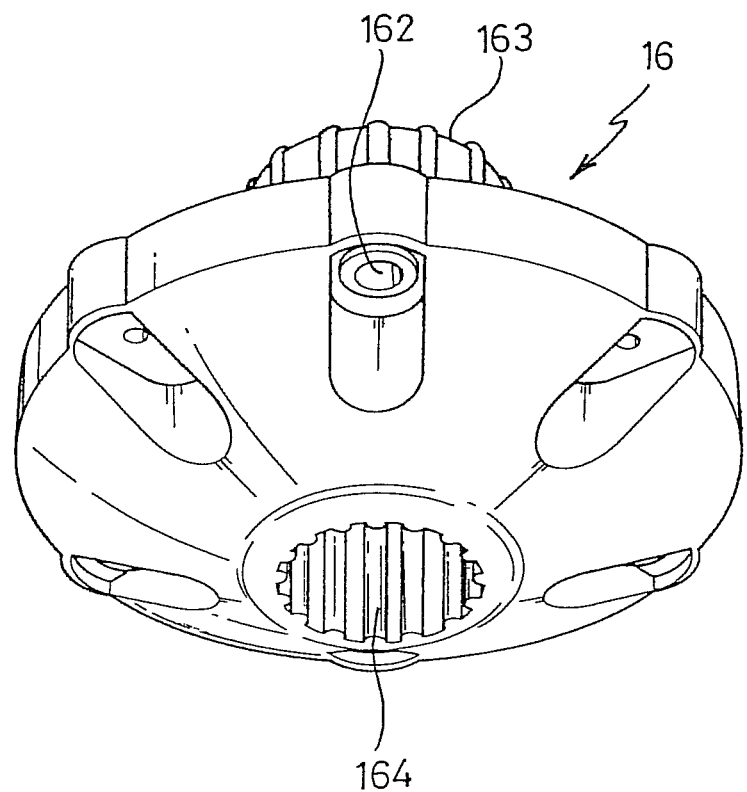
FIG. 8 illustrates a perspective view of a bottom in FIG. 7.

Reference will now be made in detail to the preferred embodiments of the present invention, examples of which are illustrated in the accompanying drawings. A first preferred embodiment of the present invention will be explained in detail with reference to FIGS. 2A~8. FIG. 2A illustrates a longitudinal section of a drum type washing machine in accordance with a first preferred embodiment of the present invention, FIG. 2B illustrates a detailed enlarged view of "A" part in FIG. 2A, FIG. 3 illustrates a perspective view with a partial cut away view of the rotor in FIG. 2, FIG. 4 illustrates an enlarged perspective view of "B" part in FIG. 3, FIG. 5 illustrates a perspective view of a bottom in FIG. 3, FIG. 6 illustrates a perspective view of the stator in FIG. 2, FIG. 7 illustrates a perspective view of the connector in FIG. 2, and FIG. 8 illustrates a perspective view of a bottom in FIG. 7.

The drum type washing machine in accordance with a first preferred embodiment of the present invention includes a tub 2 of plastic mounted inside of the cabinet 1, a drum 3 mounted in the tub 2, a shaft 4 fixed to the drum 3 for transmission of driving power from a motor 5 to the drum 3, bearings 6a and 6b fitted on outer circumference of the shaft 4 at both ends thereof, and bearing housings 7 of metal fitted to support the bearings 6a and 6b at a central portion of a rear wall 200 of the tub 2. The bearing housing 7 of metal is formed as a unit with the tub rear wall 200 by an inserted injection molding in the injection molding of the tub 2 of plastic. The bearing housing 7 is preferably formed of aluminum. The bearing housing 7 has steps 8a and 8b for holding the front bearing 6a and the rear bearing 6b fitted in inner circumferences of the bearing housing 7 for preventing the bearings 6a and 6b from being separated therefrom. Of the steps 8a and 8b formed on the inner circumferences of the bearing housing 7, the front step 8a has a form of "]" for supporting a rear end portion of the front bearing 6a fitted to a front end of an outer circumference of the shaft 4, and the rear step 8b has a form of "[" for supporting a front end portion of the rear bearing 6b fitted to a rear end portion of the shaft 4. And, there are positioning steps 400a and 400b on outer circumferences of the shaft 4 disposed inside of the bearing housing 7 which transmits driving power from the motor 5 to the drum 3, for fixing mounting positions of the front bearing 6a and the rear bearing 6b on the shaft 4. A front end of the shaft 4 is coupled to a spider 10 in a rear wall of the drum 3, a region of the shaft 4 that extends from a portion thereof exposed at a rear of the spider 10 to the front bearing 6a has a bushing 11 of brass press fit thereon for prevention of rusting, and there is a sealing member 12 on an outer surface of the bushing 11 for preventing ingress of water toward the bearing housing 7. There is a rotor 13 of a direct coupling type motor 5 fixed to a center of a rear end of the shaft 4, and a stator 14 having a crown form fixed to the rear wall 200 inside of the rotor 13. The rotor 13 and the stator 14 together form the direct coupling type motor 5.

Figure 3:
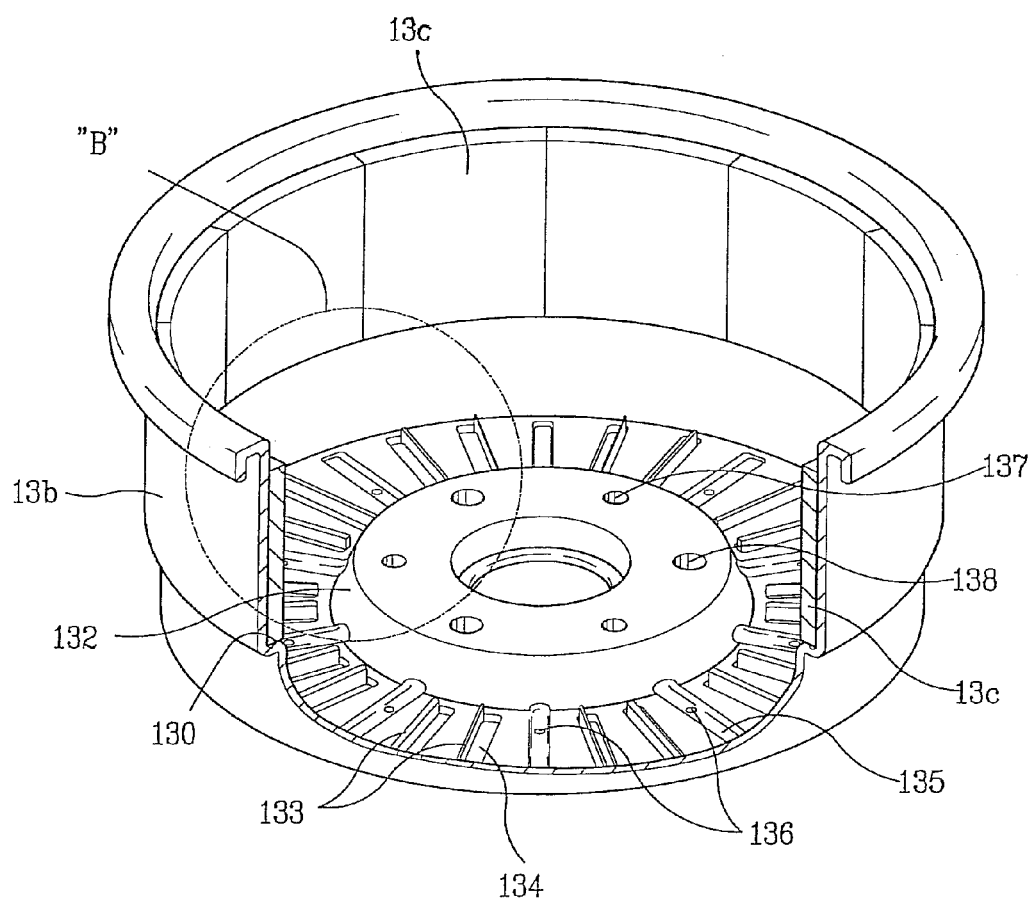
FIG. 3 illustrates a perspective view with a partial cut away view of the rotor in FIG. 2.
Figure 4:
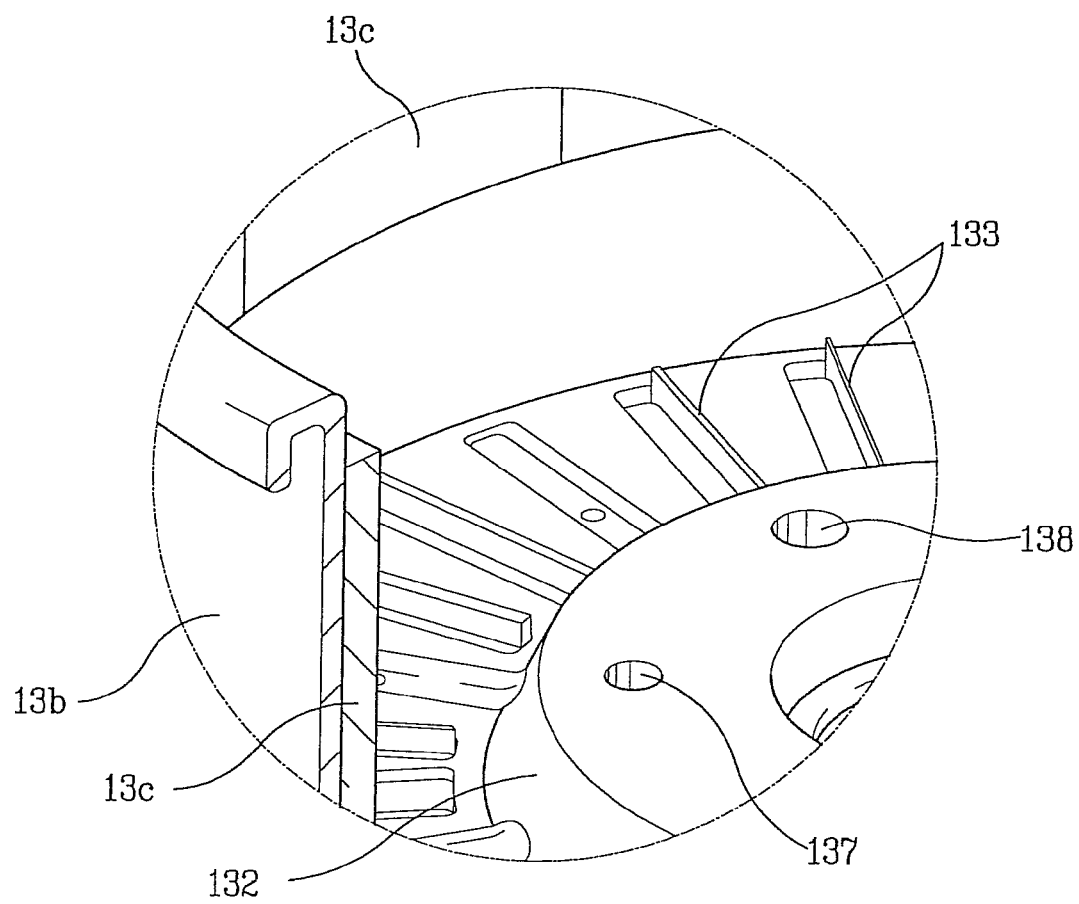
FIG. 4 illustrates an enlarged perspective view of "B" part in FIG. 3.
Figure 5:
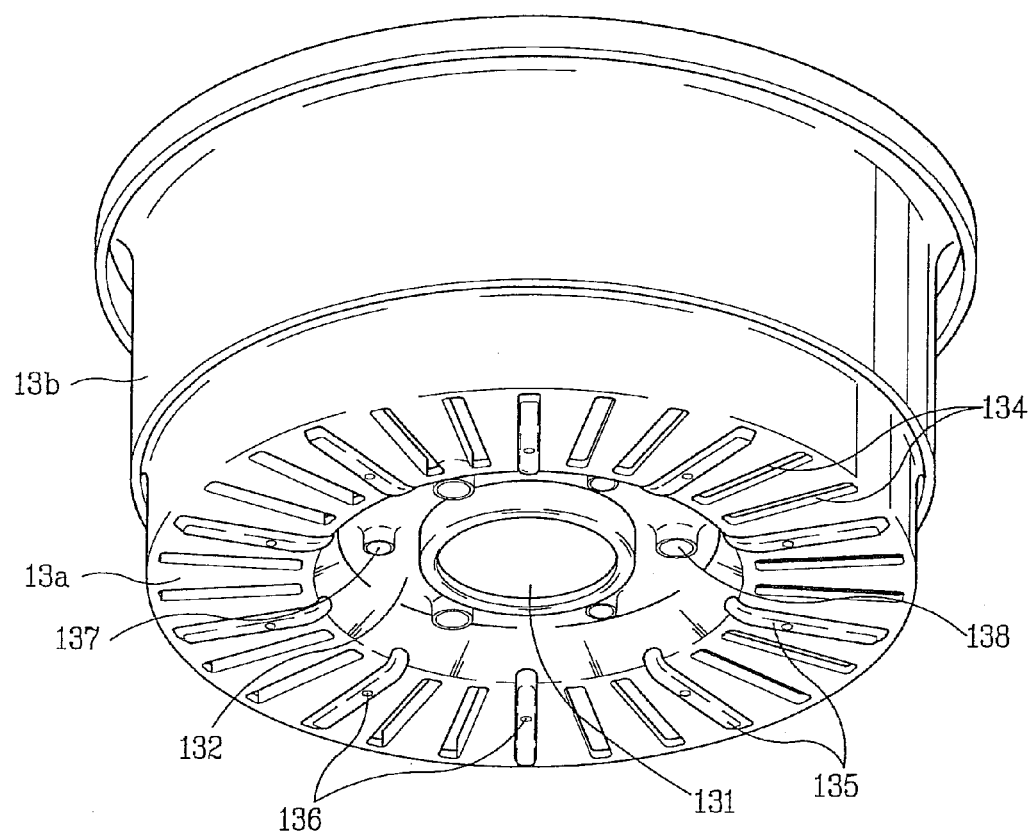
FIG. 5 illustrates a perspective view of a bottom in FIG. 3.

Referring to FIGS. 3~5, the rotor 13 of steel or steel alloy plate includes a bent portion formed along a circumference thereof having a setting surface 130 for supporting magnets 13c fitted to an inside of front of a sidewall 13b extended forward from a periphery of a rear wall 13a, and a hub 132 at a center of the rear wall 13a having a through hole 131 for fastening members 15a, such as bolts, for coupling the rotor 13 to the shaft 4. An overall form of the rotor 13 is preferably formed by press forming. There are a plurality of cooling fins 133 each formed to have a preset length in a radial direction around the hub 132 of the rotor 13 for blowing air toward the stator 14 during rotation of the rotor 13 for cooling heat generated at the stator 14. The cooling fins 133 are formed by lancing, to bend the cooling fins 133 at a right angle with respect to the rear wall 13a toward the opening so as to form through holes 134 for ventilation. There is an embossing 135 between adjacent cooling fins 133 with a drain hole 136 therein for draining water. There are fastening holes 137 for fastening a connector 16 formed to the rotor 13 and positioning holes 138 for positioning an assembly position of the connector 16 around the through hole 131 in the hub 132 of the rotor 13 at fixed intervals. The connector 16 is serration coupled to an outer circumference of a rear end portion of the shaft 4 exposed at a rear of the rear bearing 6b. The connector 16 is formed of resin having a vibration mode different from the rotor 13 of steel or steel alloy plate, and also serves as a bushing for the rotor 13. As shown in FIGS. 2B, 7 and 8, the connector 16 has fastening holes 162 to correspond to the fastening holes 137 in the hub 132 of the rotor 13, arranged in a circumferential direction of a peripheral region thereof, and a dowel pin 160 between adjacent fastening holes 162 formed as a unit with the connector 16 for insertion in the positioning holes 138 in the rotor 13 for self alignment of the fastening holes 137 and 162 in the rotor 13 and the connector 16, respectively. The connector 16 has a serration 164 in an inside circumference of the hub 163 matched to a serration on the rear end of the shaft 4, and reinforcing ribs 161 on outer circumference of the hub 163 for reinforcing the hub 163. There is a hub 201 on the rear wall 200 of the tub 2 having the bearing housing 7 inserted therein when the tub is injection molded, and fastening bosses 202 on an outer side of the hub 201 along a circumferential direction at fixed intervals for fastening the stator 14 to the rear wall 200 of the tub 2. There is a supporter 17 between the rear wall 200 of the tub 2 and the stator 14, of a form almost identical to an outline of the tub rear wall 200, fixed to the tub rear wall 200 when the stator 14 is assembled for supporting the stator 14 and maintaining concentricity of the stator 14. The supporter 17 has a fore end brought into a close contact with an inside of ribs 203 at one side of the tub rear wall 200, and a rear end brought into a close contact with an outer circumference of a rear end of the bearing housing 7 which is not enclosed by the hub 132, but exposed. In the meantime, as shown in FIGS. 2B and 6, the stator 14 includes a magnetic core 145 of segregated layers of magnetic material, a frame 140 of resin coated on the magnetic core 145, a coil 142 wound around each of winding parts 141 on an outer circumference of the frame 140, and fastening ribs 143 on an inside of the frame 140 for fastening the stator 14 to the tub rear wall 200.

The operation of the driving unit in a drum type washing machine in accordance with a first preferred embodiment of the present invention will be explained. The rotor 13 is rotated in response to a current flowing to the coils 142 of the stator 14 in a sequence under the control of a motor driving controller (not shown) fitted on a panel, and the shaft 4, which is serration coupled with the connector 16 fixed to the rotor 13 is rotated, together with the drum 3 as the power is transmitted to the drum 3 through the shaft 4.

The tub 2 of the drum type washing machine of the present invention, formed of a plastic with excellent heat resistance, is light and has good formability as the tub 2 is injection molded. Since the bearing housing 7 in the drum type washing machine of the present invention is formed of a metal, such as aluminum and the like, the bearing housing 7 is applicable to a drum type washing machine having a drying cycle, as the bearing housing shows no thermal deformation. And, since the metallic bearing housing 7 of the present invention is formed integrated with the tub 2 by inserting the bearing housing 7 in the hub 201 on the tub rear wall 200 before the tub 2 of plastic is injection molded, a separate step for assembling the bearing housing 7 to the tub rear wall 200 can be omitted, which simplifies an assembly process and reduces assembly man-hours. The "]" form of the step 8a in a front portion of an inner circumference of the bearing housing 7 and the "[" form of the step 8b in a rear portion of an inner circumference of the bearing housing 7 provide support to a rear end of the front bearing 6a and a fore end of the rear bearing 6b mounted on outer circumference of the shaft 4 at both end portions thereof. That is, the steps 8a and 8b on inner circumferences of the metallic bearing housing 7 on both sides thereof prevent both bearings 6a and 6b from being separated from the bearing housing 7. The positioning steps 400a and 400b on outer circumferences of the shaft 4 at front and rear portions thereof permit easy positioning of the front bearing 6a and the rear bearing 6b on the shaft 4 in the assembly. The front end portion of the shaft 4 is coupled to the spider 10 in the rear wall, and the brass bushing 11 press fit to the region from the exposed portion outside of the spider 10 of the shaft 4 to the front bearing 6a prevents rusting of the shaft 4. The sealing member 12 outside of the bushing 11 prevents ingress of water toward the bearing.

In the meantime, the rotor 13 of the direct coupling type motor 5 is mounted on a center of the rear end portion of the shaft 4, with the stator 14 disposed on an inner side of the rotor 13, wherein the bend part having the magnet setting surface 130 is formed along a circumferential direction of the sidewall 13b, extending forward from a periphery of the rear wall 13a of the rotor 13, for supporting the magnets 13c when the magnets 13c are fitted to an inside surface of the rotor 13, to fabricate the rotor with ease. The through hole 131 of the hub 132 at a center of the rear wall 13a of the rotor 13 permits the fastening member 15b, such as a bolt or the like, to pass therethrough for fastening the rotor 13 to the shaft 4, and the plurality of cooling fins 133 arranged around the hub 132 of the rotor 13 in a radial direction and having a certain length blow air toward the stator 14 during rotation of the rotor 13 for cooling down a heat generated at the stator 14. The cooling fins 133 are formed by lancing, so as to direct flow toward the opening of the rotor 13, and to leave through holes 134 for ventilation. The rotor 13 of steel or steel alloy plate is formed by pressing, which shortens a fabrication time period and improves productivity. The embossing 135 between the adjacent cooling fins 133 of the rear wall 13a of the rotor 13 improves an overall strength of the rotor 13, and the drain hole 136 in the embossing 135 drains water.

In the meantime, the fastening holes 137 for fastening the connector and the positioning holes 138 for fixing an assembly position of the connector 16 around the through hole 131 in the hub 132 of the rotor 13 permits an easy assembly of the connector 16 to the rotor. The connector 16 is serration coupled to the outer circumference of the rear end portion of the shaft 4 exposed to rear of the rear bearing 6b. That is, once the dowel pins 160 on the connector 16 are inserted in the positioning holes 138 in the rotor 13, the fastening holes 137 and 162 in the rotor 13 and the connector 16 are matched automatically, and by fastening the fastening members 15c through the fastening holes 137 and 162 in the rotor 13 and the connector 16, the connector 16 and the rotor 13 can be assembled with ease. The connector 16 serves to damp vibration from the rotor 13 to the shaft 4 as the connector 16, which is injection molded of a resin, has a different vibration mode from the rotor 13 of steel or steel alloy plate. The serration 164 in the inner circumference of the hub 163 of the connector 16 is fit to the serration 400 on the rear end portion of the shaft 4, to transmit the rotating force of the rotor 13 to the shaft, directly. The reinforcing ribs 161 on an outer circumference of the hub 163 of the connector 16 reinforce the hub 163.

In the meantime, the fastening bosses 202 along a circumference on an outer side of the hub 201 on the rear wall 200 of the tub 2 at fixed intervals allow the stator 14 to be fixed to the rear wall 200 of the tub 2 by using the fastening boss 202. The supporter 17 between the rear wall 200 of the tub 2 and the stator 14 having a form almost identical to the outline of the rear wall 200 so as to be fixed to the rear wall 200 of the tub 2 and have the stator 14 is fastened thereto permits the stator 14 to be supported and maintain concentricity. That is, once the supporter 17 is fastened to the fastening bosses 204 on the tub rear wall 200, the fore end of the supporter 17 is brought into close contact with an inside surface of the ribs 203 at one side of the tub rear wall 200 and the rear end of the supporter 17 is brought into close contact with the outer circumference of the rear end portion of the bearing housing 7 at a central portion of the tub rear wall 200, which can not be enclosed, but exposed, by the hub 132, such that the supporter 17 supports the stator 14 as well as maintains a concentricity of the stator 14.

The structure of a driving unit in a drum type washing machine in accordance with a first preferred embodiment of the present invention has the following advantages.

The motor direct coupling structure of the drum type washing machine in accordance with a first preferred embodiment of the present invention provides for reduced repair, and reduced power loss.

The bearing housing of metal in the drum type washing machine in accordance with a first preferred embodiment of the present invention shows no thermal deformation, allowing this to be applied to a product having a drying function.

The rotor of steel or steel alloy plate formed by pressing in the drum type washing machine in accordance with a first preferred embodiment of the present invention requires a very short fabrication time period, with improved productivity, because the steel or steel alloy plate pressing has excellent formability.

And, the magnet setting surface on the rotor of the present invention improves a workability in fitting the magnets, and the drain holes, the cooling fins, and the through holes provided to the rotor can prevent overheating of the motor, improve a reliability of the motor, and prolong a lifetime of the motor.

And, the connector having a vibration mode different from the rotor in the drum type washing machine of the present invention can attenuate the vibration transmitted from the rotor to the shaft, and the supporter can support the stator and maintain a concentricity of the stator.

Figure 9:
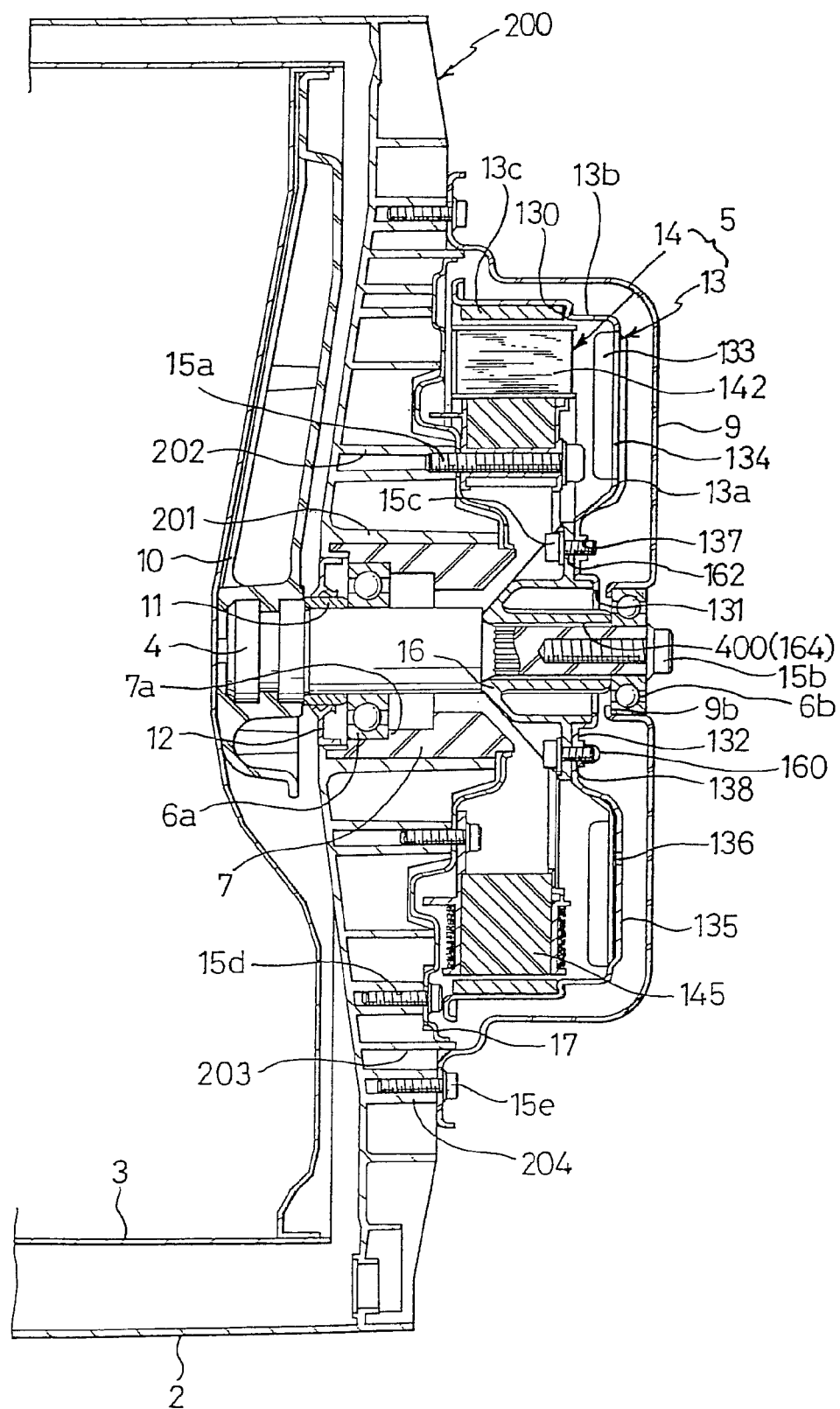
FIG. 9 illustrates a longitudinal section of a driving unit in a drum type washing machine in accordance with a second preferred embodiment of the present invention.

A driving unit in a drum type washing machine in accordance with a second preferred embodiment of the present invention will be explained with reference to FIGS. 3~9, in detail. FIG. 9 illustrates a longitudinal section of a driving unit in a drum type washing machine in accordance with a second preferred embodiment of the present invention. The rotor, the stator and the connector in the second preferred embodiment of the present invention are identical to those of the first embodiment, to which the same names and reference symbols are given, and will be explained with reference to FIGS. 3~8.

The drum type washing machine in accordance with a second preferred embodiment of the present invention includes a tub 2 mounted inside of a cabinet 1, a drum 3 mounted inside of the tub 2, a shaft 4 connected to the drum mounted inside of the tub 3 for transmission of a driving force from the motor 5 to the drum, a front bearing 6a and a rear bearing 6b mounted on outer circumferences of the shaft 4 at both end portions thereof respectively, a bearing housing 7 built in a central portion of the rear wall 200 of the tub 3 for supporting the front bearing 6a, a rotor 13 coupled to the shaft 4, a stator 14 provided inward of the rotor 13 coupled to the tub rear wall 200, a connector 16 that is serration coupled to an outer circumference of the shaft 4 in front of the rear bearing 6b and fixed to the rotor 13 for transmission of a rotating force of the rotor 13 to the shaft 4, a supporter 17 fitted between the rear wall 200 of the tub 2 and the stator 14 for supporting the stator 14 and maintaining a concentricity when the stator 14 is mounted to the tub rear wall 200, and a bearing bracket 9 fixed to the tub rear wall 200 for covering an outside of the rotor 13 and supporting the front end portion of the rear bearing 6b. The tub 2 is formed of plastic, and has an opened front and a closed rear wall 200 having a thickness that is greater than a thickness of a sidewall, and the bearing housing 7 at the central portion of the rear wall 200 of the tub 2 is formed of a metal, wherein the bearing housing 7 is insert injection molded when the plastic tub 2 is injection molded, such that the bearing housing 7 is integrated with the tub rear wall 200. The bearing housing 7 is preferably formed of an aluminum alloy.

In the meantime, there is a step 7a on an inner circumference of the metallic bearing housing 7 for supporting the front bearing 6a to prevent the front bearing 7 from being separated from the bearing housing 7. The step 7a on the inner circumference of the bearing housing 7 has a form of "]" to support a rear end portion of the front bearing 6a mounted on a front end portion of the shaft 4. The front end portion of the shaft 4 is fixed to a spider 10 in the rear wall 200 of the drum 3, a region of the shaft 4 from a portion exposed at a rear of the spider 10 to the front bearing 6a has a bushing 11 of brass press fit thereon for prevention of rusting, and there is a sealing member 12 on an outer surface of the bushing 11 for preventing ingress of water toward the front bearing 6a. The connector 16 is serration coupled to the rear end portion of the shaft 4 for connection between the rotor 13 of the direct coupling type motor 5 and the shaft 4, the rotor 13 is fixed to the connector 16 with fastening members 15c, and the stator 14, forming the direct coupling type motor together with the rotor 13, is fixed to the rear wall 200 of the tub 2 inward of the rotor 13. As shown in FIGS. 3~5, the rotor 13 of steel or steel alloy plate includes a bend part having a magnet setting surface 130 formed along a circumferential direction of a sidewall 13b extended forward from a periphery of the rear wall 13a of the rotor 13, for supporting magnets 13c fitted to a front portion of an inside surface of the rotor 13, and a hub 132 having a through hole 131 at a center of the rear wall 13a of the rotor 13 so that a fastening member 15a, such as a bolt or the like, can pass through for coupling the rotor 13 to the shaft 4. An overall form of the rotor 13 is preferably formed by pressing. There are a plurality of cooling fins 133 each formed to have a preset length in a radial direction around the hub 132 of the rotor 13 for blowing air toward the stator 14 during rotation of the rotor 13 for cooling heat generated at the stator 14. The cooling fins 133 are formed by lancing, to bend the cooling fins 133 at a right angle with respect to the rear wall 13a oriented toward the opening to leave through holes 134 for ventilation. There is an embossing 135 between adjacent cooling fins 133 with a drain hole 136 therein for draining water. There are fastening holes 137 for fastening a connector 16 to the rotor 13 and positioning holes 138 for positioning an assembly position of the connector 16 around the through hole 131 in the hub 132 of the rotor 13 at fixed intervals. The connector 16 is serration coupled to an outer circumference of a rear end portion of the shaft 4 exposed at a rear of the rear bearing 6b. The connector 16 is formed of resin having a vibration mode different from the rotor 13 of steel or steel alloy plate. As shown in FIGS. 7~9, the connector 16 has fastening holes 162 to correspond to the fastening holes 137 in the hub 132 of the rotor 13 arranged in a circumferential direction of a peripheral region thereof and a dowel pin 160 between adjacent fastening holes 162 formed as a unit with the connector 16 for insertion in the positioning hole 138 in the rotor 13 for self alignment of the fastening holes 137 and 162 in the rotor 13 and the connector 16, respectively. The connector 16 has a serration 164 in an inside circumference of the hub 163 matched to the serration on the rear end of the shaft 4, and reinforcing ribs 161 on an outer circumference of the hub 163 for reinforcing the hub 163. There is a hub 201 on the rear wall 200 of the tub 2 having the bearing housing 7 inserted therein when the tub 2 is injection molded, and fastening bosses 202 on an outer side of the hub 201 along a circumferential direction at fixed intervals for fastening the stator 14 to the rear wall 200 of the tub 2. There is a supporter 17 between the rear wall 200 of the tub 2 and the stator 14, having a form almost identical to an outline of the rear wall 200, fixed to the tub 2 rear wall 200 when the stator 14 is assembled for supporting the stator 14 and maintaining concentricity of the stator 14. Once the supporter 17 is fastened to the support fastening bosses 204, a fore end of the supporter 17 is brought into close contact with an inside of ribs 203 at one side of the tub rear wall 200, and a rear end thereof is brought into close contact with an outer circumference of a rear end of the bearing housing 7 which is not enclosed by the hub 132, but exposed. Thus, the supporter 17 supports the stator 14 and maintains a concentricity of the stator 14. In the meantime, as shown in FIGS. 3 and 6, the stator 14 includes a ring formed frame 140, a coil 142 wound around each of winding parts 141 on an outer circumference of the frame 140, and fastening ribs 143 on an inside of the frame 140 for fastening the stator 14 to the tub rear wall 200.

In the meantime, referring to FIG. 9, there is an "[" formed step 9b at an inner end portion of the bearing bracket 9 fixed to the tub rear wall 200 to cover an outer side of the rotor 13. And, there is a rear bearing fixing member 15b at a rear end of the shaft 4 for supporting a rear surface of the shaft 4 to prevent the rear bearing from being separated from the shaft 4.

The operation of the driving unit in a drum type washing machine in accordance with a second preferred embodiment of the present invention will be explained. The rotor 13 is rotated in response to a current flowing to the coils 142 of the stator 14 in a sequence under the control of a motor driving controller (not shown) fitted on a panel, and the shaft 4, which is serration coupled with the connector 16 fixed to the rotor 13, is rotated, together with the drum 3 as power is transmitted to the drum 3 through the shaft 4.

The drum type washing machine in accordance with the second preferred embodiment of the present invention has advantages. Like the first embodiment of the present invention, since the tub 2 is formed of a plastic with excellent heat resistance, the tub 2 is light and has good formability as the tub 2 is injection molded. Since the bearing housing 7 is formed of a metal, such as an aluminum alloy and the like, the bearing housing 7 is applicable to a drum type washing machine also having a drying cycle as the bearing housing 7 shows no thermal deformation. And, since the metallic bearing housing 7 is formed integrated with the tub 2 by inserting the bearing housing 7 in the hub 201 on the tub rear wall 200 before the tub 2 of plastic is injection molded, a separate step for assembling the bearing housing 7 to the tub rear wall 200 can be omitted, which simplifies an assembly process and reduces assembly man-hours. The step 7a in an inner circumference of a front portion of the bearing housing 7 in the second embodiment of the present invention supports a rear end of the front bearing 6a mounted on an outer circumference of the fore end portion of the shaft 4. That is, the "]" formed step 7a in a front portion of an inner circumference of the metallic bearing housing 7 of the present invention provides support to the front bearing 6a without being separated from the bearing housing 7. And, the "[" formed step 9b in an end portion of an inner circumference of the metallic bearing bracket 9 covering an outer side of the rotor 13 fixed to the tub rear wall 200 provides support to a front end of the rear bearing 6b mounted on the rear end portion of the shaft 4, and the rear bearing fixing member 15b on the rear end surface of the shaft 4 prevents the rear bearing 6b from being separated from the shaft 4.

In the meantime, in the second preferred embodiment of the present invention, since the front bearing 6a is mounted in the bearing housing 7 having been insert injection molded in the tub 2, and the rear bearing 6b is mounted in an inside of a center portion of the bearing bracket 9, a distance between the front and rear bearings 6a and 6b on the shaft 4 becomes greater, between which the rotor 13 is mounted. The greater distance between the front and rear bearings 6a and 6b better withstands a load caused by imbalance of laundry in the drum 3 during spinning, and a supporting force to the rotor 13 is enhanced as the rotor 13 of the motor is mounted between the front and rear bearings 6a and 6b. Like the first preferred embodiment of the present invention, in the second preferred embodiment of the present invention, the brass bushing 11 press fit to the region from the exposed portion outside of the spider 10 of the shaft 4 to the front bearing 6a prevents rusting of the shaft 4. Similarly, the sealing member 12 outside of the bushing 11 prevents ingress of water toward the bearing.

Like the first preferred embodiment, as shown in FIGS. 3 to 6, the bend part having the magnet setting surface 130 is formed along a circumferential direction of the sidewall 13b extended forward from a periphery of the rear wall 13a of the rotor 13, for supporting the magnets 13c when the magnets 13c are fitted to an inside surface of the rotor 13, to fabricate the rotor with ease. Like the first preferred embodiment of the present invention, in the second preferred embodiment of the present invention, the plurality of cooling fins 133 around the hub 132 of the rotor 13 in a radial direction having a certain length blow air toward the stator 14 during rotation of the rotor 13 for cooling down heat generated at the stator 14. The cooling fins 133 are formed by lancing, oriented toward the opening of the rotor 13, and leave through holes 134 for ventilation. Since the rotor 13 is formed of steel or steel alloy plate by pressing, which shortens a fabrication time period significantly, productivity is improved. The embossing 135 between the adjacent cooling fins 133 of the rear wall 13a of the rotor 13 improves an overall strength of the rotor 13, and the drain hole 136 in the embossing 135 drains water.

In the meantime, the fastening holes 137 for fastening the connector and the positioning holes 138 for fixing an assembly position of the connector 16 around the through hole 131 in the hub 132 of the rotor 13 permits an easy assembly of the connector 16 to the rotor 13. The connector 16 is serration coupled to the outer circumference of the rear end portion of the shaft 4. That is, once the dowel pins 160 on the connector 16 are inserted in the positioning holes 138 in the rotor 13, the fastening holes 137 and 162 in the rotor 13 and the connector 16 are matched automatically, and by fastening the fastening members 15c through the fastening holes 137 and 162, the connector 16 and the rotor 13 can be assembled with ease. The connector 16 serves to damp vibration from the rotor 13 to the shaft 4 as the connector 16 injection molded of a resin has a different vibration mode from the rotor 13 of steel or steel alloy plate. The serration 164 in the inner circumference of the hub 163 of the connector 16 is fit to the serration 400 on the rear end portion of the shaft 4, to transmit the rotating force of the rotor 13 to the shaft, directly. The reinforcing ribs 161 on an outer circumference of the hub 163 of the connector 16 reinforce the hub 163.

In the meantime, the fastening bosses 202 along a circumference on an outer side of the hub 201 on the rear wall 200 of the tub 2 at fixed intervals permit the stator 14 to be fixed to the rear wall 200 of the tub 2 by using the fastening boss 202. The supporter 17 between the rear wall 200 of the tub 2 and the stator 14 having a form almost identical to the outline of the rear wall 200 for being fixed to the rear wall 200 of the tub 2 when the stator 14 is fastened permits the stator 14 to be supported and concentricity to be maintained. That is, the front end of the supporter 17 is brought into close contact with an inside surface of the ribs 203 at one side of the tub rear wall 200 and the rear end of the supporter 17 is brought into close contact with the outer circumference of the rear end portion of the bearing housing 7 at a central portion of the tub rear wall 200, which can not be enclosed, but exposed, by the hub 132, such that the supporter 17 supports the stator 14 as well as maintains a concentricity of the stator 14.

The structure of a driving unit in a drum type washing machine in accordance with a second preferred embodiment of the present invention has the following advantages.

The motor direct coupling structure of the drum type washing machine of the present invention provides reduced repair, noise and power loss.

The bearing housing of metal in the drum type washing machine of the present invention shows no thermal deformation, and may be applied to a product having a drying function.

The rotor of steel or steel alloy plate formed by pressing in the drum type washing machine of the present invention requires a very short fabrication time period, with improved productivity, because the steel or steel alloy plate pressing has excellent formability.

And, the magnet setting surface on the rotor of the present invention improves a workability in fitting the magnets, and the drain holes, the cooling fins, and the through holes provided to the rotor can prevent overheating of the motor, improve a reliability of the motor, and prolong a lifetime of the motor.

And, the connector having a vibration mode different from the rotor in the drum type washing machine of the present invention can attenuate the vibration transmitted from the rotor to the shaft, and the supporter can support the stator and maintain a concentricity of the stator.

Particularly, in the second preferred embodiment of the present invention, the greater distance between the front and rear bearings permits better withstands a load caused by imbalance of laundry in the drum 3 during spinning, and a supporting capability to the rotor is enhanced as the rotor of the motor is mounted between the front and rear bearings.

Thus, by improving a structure of a driving unit of a drum type washing machine, the present invention can improve noise, repair and power loss, can improve a washing capability, can improve a product reliability, and, by improving workability in fabrication of components of the driving unit, can improve a productivity.

It will be apparent to those skilled in the art that various modifications and variations can be made in the structure of a driving unit in a drum type washing machine of the present invention without departing from the spirit or scope of the invention. Thus, it is intended that the present invention cover the modifications and variations of this invention provided they come within the scope of the appended claims and their equivalents.

What is claimed is:
1. A washing machine comprising:
a tub comprising plastic and including an opened front, a closed rear wall, and a sidewall extending from a periphery of the rear wall to the opened front, wherein the tub is cylindrical;
a drum mounted rotatably in the tub;
a stator including a magnetic core having a stack of layers of magnetic material and a winding part having a coil wound thereon for forming a magnetic force;
a bearing housing comprising metal, and including a cylindrical aperture therethrough defining an inner circumference, wherein the bearing housing is mounted proxi- mate to a central portion of the rear wall of the tub by insert injection molding, and protrudes toward the stator;

a shaft passing through the bearing housing, the shaft having one end directly connected to the drum;

at least one bearing mounted between the shaft and the bearing housing for supporting the shaft; and a rotor comprising a sidewall, a rear wall and a permanent magnet fixed to the sidewall of the rotor, wherein the rotor is coupled to the shaft.

2. The washing machine of claim 1, wherein a body of the rotor is entirely formed of metal.

3. The washing machine of claim 1, wherein the rear wall and the side wall of the rotor are entirely formed of metal.

4. The washing machine of claim 1, further comprising a connector connecting the rotor to the shaft.

5. The washing machine of claim 4, wherein the connector is serration coupled to the shaft.

6. The washing machine of claim 4, wherein the connector has a flange abutting the rotor.

7. The washing machine of claim 4, wherein the connector is formed of an electrically insulating material.

8. The washing machine of claim 1, further comprising a supporter inserted between the stator and the rear wall of the tub.

9. The washing machine of claim 8, wherein the supporter is formed separately from the stator and the rear wall of the tub.

10. The washing machine of claim 8, wherein the supporter surrounds the bearing housing.

11. The washing machine of claim 8, wherein the supporter contacts the bearing housing.

12. The washing machine of claim 1, wherein the supporter abuts the protruding bearing housing.

13. The washing machine of claim 1, wherein the bearing housing protrudes toward stator from the rear wall of the tub.

14. The washing machine of claim 1, wherein the bearing housing rises above portions of the rear wall of the tub other than the central portion thereof.

15. The washing machine of claim 1, wherein at least a portion of the protruding bearing housing is exposed outside the rear wall of the tub.

16. The washing machine of claim 1, wherein the protruding bearing housing includes an end facing the rotor, and wherein the end of the protruding bearing housing is exposed outside the rear wall of the tub.

17. The washing machine of claim 1, wherein an outer circumference of the protruding bearing is exposed outside the rear wall of the tub.

18. The washing machine of claim 1, wherein the bearing housing is inserted into the stator.

19. The washing machine of claim 1, wherein the bearing housing faces an inner circumference of the stator.

20. The washing machine of claim 1, wherein the bearing housing directly faces an inner circumference of the stator.

21. The washing machine of claim 1, wherein the bearing housing directly faces an inner surface of the rotor.

22. The washing machine of claim 1, wherein the protruding bearing housing receives the bearing.

23. The washing machine of claim 1, wherein the stator is disposed around the bearing housing.

24. The washing machine of claim 1, wherein the stator encloses the bearing housing.

25. The washing machine of claim 1, wherein an inner circumference of the stator faces the bearing housing.

* * * * *